United States Patent
Price et al.

(10) Patent No.: US 10,931,959 B2
(45) Date of Patent: Feb. 23, 2021

(54) SYSTEMS AND METHODS FOR REAL-TIME VIDEO TRANSCODING OF STREAMING IMAGE DATA

(71) Applicant: Forcepoint LLC, Austin, TX (US)

(72) Inventors: Mark Price, Salt Lake City, UT (US); Jason Clinton, Salt Lake City, UT (US); Scott Grimes, Salt Lake City, UT (US)

(73) Assignee: Forcepoint LLC, Austin, TX (US)

( * ) Notice: Subject to any disclaimer, the term of this patent is extended or adjusted under 35 U.S.C. 154(b) by 114 days.

(21) Appl. No.: 15/975,589

(22) Filed: May 9, 2018

(65) Prior Publication Data

US 2019/0349595 A1   Nov. 14, 2019

(51) Int. Cl.
*H04N 19/44*   (2014.01)
*H04N 19/172*   (2014.01)
*H04N 7/01*   (2006.01)

(52) U.S. Cl.
CPC .............. *H04N 19/44* (2014.11); *H04N 7/01* (2013.01); *H04N 19/172* (2014.11)

(58) Field of Classification Search
CPC ......... H04N 19/44; H04N 7/01; H04N 19/172
See application file for complete search history.

(56) References Cited

U.S. PATENT DOCUMENTS

| | | | | |
|---|---|---|---|---|
| 9,973,785 | B1* | 5/2018 | Yang | H04L 65/80 |
| 2007/0133678 | A1* | 6/2007 | Sakai | H04N 19/82 |
| | | | | 375/240.03 |
| 2009/0033669 | A1* | 2/2009 | Hochmuth | G09G 5/006 |
| | | | | 345/520 |
| 2011/0119716 | A1* | 5/2011 | Coleman, Sr. | H04N 7/181 |
| | | | | 725/62 |
| 2013/0148741 | A1* | 6/2013 | Steinberg | H04N 19/40 |
| | | | | 375/240.25 |
| 2014/0187239 | A1* | 7/2014 | Friend | H04L 67/06 |
| | | | | 455/426.1 |
| 2015/0077509 | A1* | 3/2015 | Ben Natan | G10L 19/173 |
| | | | | 348/14.09 |
| 2015/0138237 | A1* | 5/2015 | Ghosh | G09G 5/36 |
| | | | | 345/634 |
| 2016/0191598 | A1* | 6/2016 | DeFrancesco | G06Q 30/0241 |
| | | | | 709/219 |
| 2016/0314819 | A1* | 10/2016 | Elsner | H04N 19/136 |
| 2017/0289214 | A1* | 10/2017 | Cho | H04L 65/4015 |
| 2017/0289615 | A1* | 10/2017 | Kobayashi | H04N 21/242 |
| 2018/0246646 | A1* | 8/2018 | Karkkainen | G06F 3/064 |

* cited by examiner

Primary Examiner — Joseph Suh
(74) Attorney, Agent, or Firm — Jackson Walker L.L.P.

(57) ABSTRACT

A method, system, and computer-usable medium are usable for receiving a video stream of image frames in a video format, decoding image frames of the video stream from the video format, for each respective frame of the image frames, upon completion of decoding of the respective frame, asynchronously encoding the respective frame into a lossless compression format, and asynchronously streaming all of the respective frames as encoded into the lossless compression format as a resulting video stream for display to a video display device.

12 Claims, 7 Drawing Sheets

SYSTEMS AND METHODS FOR REAL-TIME VIDEO TRANSCODING OF STREAMING IMAGE DATA

FIELD OF DISCLOSURE

The present disclosure relates in general to the field of computers and similar technologies, and in particular to software utilized in this field. Still more particularly, it relates to a method, system, and computer-usable medium for performing real-time video transcoding of image data associated with a stream of image data from remotely monitored user interaction with content displayed within a user interface of an endpoint device.

BACKGROUND

Remote monitoring of a device's user interface (UI), sometimes referred to as remote desktop sharing, is widely used by many organizations for technical support, troubleshooting, and security surveillance. In general, remote monitoring approaches typically capture the content of one or more display screens, including mouse position and user keystrokes. This display information is sent over a network to a remote computer, such as a server, and can be stored in a repository for future playback.

When larger volumes of content are involved, it is common to implement a software application, such as a web browser plug-in, to communicate display information (e.g., individual pixels) directly to the UI of the user's device in the form of a streaming video or a series of still frame images that appears as streaming video to the user. However, processing such streaming data in a web browser, while keeping up with processing demands for converting and displaying images in real-time, is very resource intensive on the browser. Accordingly, first processing the video on the server and streaming the video images to the browser improves processing load on the browser. When streaming display information to a web browser, additional processing is required to meet the input requirements of a browser versus a standalone application. This processing, referred to herein as transcoding' involves converting the video data stream, encoding it for transmission, and sending it to a browser. However, such streaming data may be challenging to display in a web browser while keeping up with processing demands for transcoding the video data. A particular necessity for playback of monitored video content is that the playback retain high image fidelity for viewing text detail. Lossy compression formats such as the Joint Photographic Experts Group (JPEG) standard are often not able to meet the high image fidelity requirement because of loss of image quality when scaled. However, converting intermediate images into a non-lossy format, such as Portable Network Graphics (PNG) format, maintains desired video quality, but comes with a steep computational cost, as conversion to PNG, encoding of the result of the conversion, and streaming of the encoded result is computationally intensive, and may take longer to decode sequential images into a high-quality PNG video stream, and encode them than it does to playback the video, thus preventing viewing of streaming image data in real time using traditional approaches.

SUMMARY

In accordance with the teachings of the present disclosure, certain disadvantages and problems associated with existing approaches to remote desktop monitoring may be reduced or eliminated.

In accordance with embodiments of the present disclosure, a computer-implementable method may include receiving a video stream of image frames in a video format, decoding image frames of the video stream from the video format, for each respective frame of the image frames, upon completion of decoding of the respective frame, asynchronously encoding the respective frame into a lossless compression format, and asynchronously streaming all of the respective frames as encoded into the lossless compression format as a resulting video stream for display to a video display device.

In accordance with these and other embodiments of the present disclosure, a system may include a processor, a data bus coupled to the processor, and a non-transitory, computer-readable storage medium embodying computer program code, the non-transitory, computer-readable storage medium being coupled to the data bus, the computer program code interacting with a plurality of computer operations and comprising instructions executable by the processor. The instructions may be configured for receiving a video stream of image frames in a video format, decoding image frames of the video stream from the video format, for each respective frame of the image frames, upon completion of decoding of the respective frame, asynchronously encoding the respective frame into a lossless compression format, and asynchronously streaming all of the respective frames as encoded into the lossless compression format as a resulting video stream for display to a video display device.

In accordance with these and other embodiments of the present disclosure, a non-transitory, computer-readable storage medium may embody computer program code, the computer program code comprising computer executable instructions configured for receiving a video stream of image frames in a video format, decoding image frames of the video stream from the video format, for each respective frame of the image frames, upon completion of decoding of the respective frame, asynchronously encoding the respective frame into a lossless compression format, and asynchronously streaming all of the respective frames as encoded into the lossless compression format as a resulting video stream for display to a video display device.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

Figure 1:
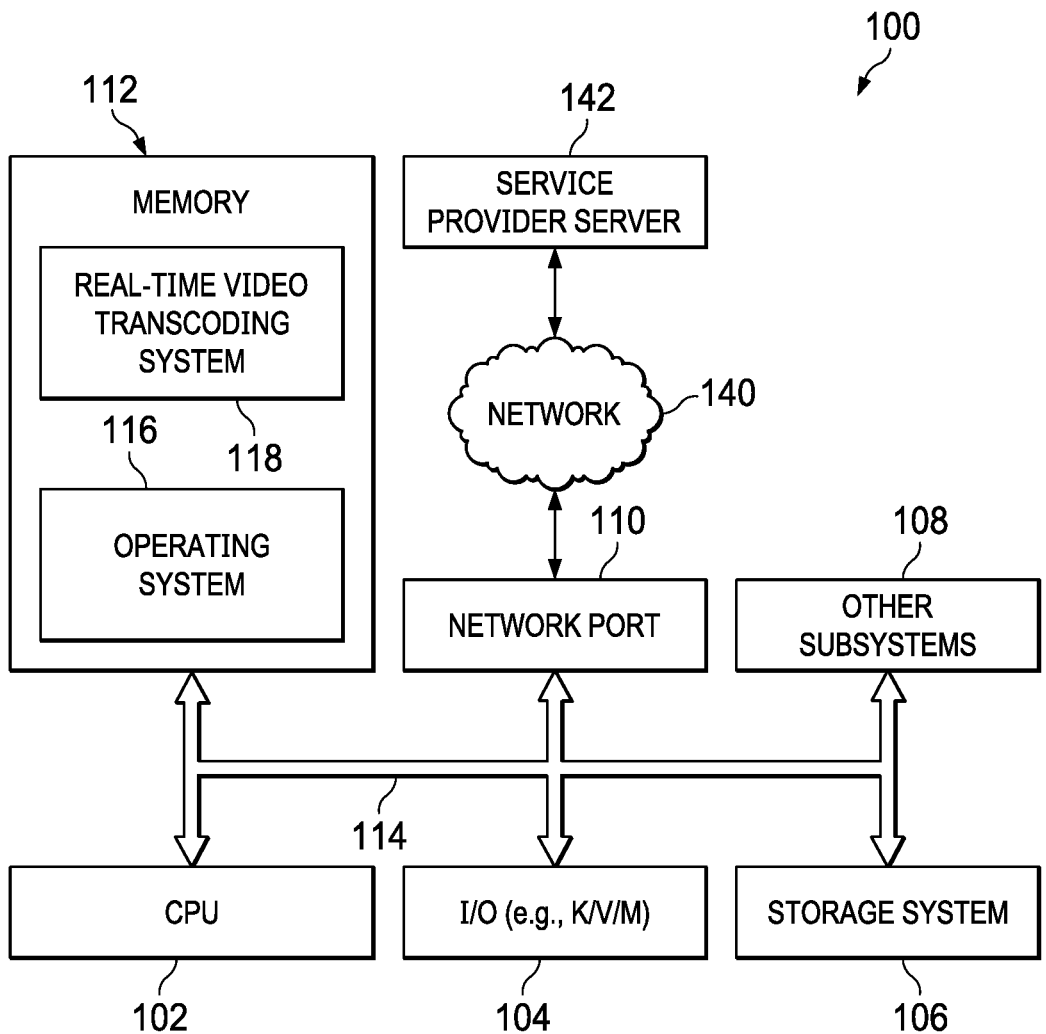
FIG. 1 illustrates a simplified block diagram of an example information handling system in which the methods and systems disclosed herein may be implemented, in accordance with embodiments of the present disclosure.

A method, system, and computer-usable medium are disclosed for real-time video transcoding of streaming image data when remotely monitoring user interaction with content displayed within a user interface. Certain aspects of this disclosure may reflect an appreciation that typical remote monitoring approaches often require the implementation of certain software applications, such as a web browser plug-in, to communicate display information (e.g., individual pixels) directly to a target device.

Certain aspects of this disclosure may likewise reflect an appreciation that such software applications often rely on various encoding and compression algorithms to reduce the amount of bandwidth used to communicate large volumes of multimedia data.

Likewise, certain aspects of this disclosure may reflect an appreciation that lossy video compression algorithms are commonly used to compress multimedia data, such as audio, video and images, especially in applications such as streaming media. Certain aspects of the disclosure likewise reflect an appreciation that the use of lossy video compression has certain advantages and disadvantages. As an example, such data encoding approaches reduce data size for storing, handling and communicating content. However, they use inexact approximations and partial data discarding to represent content. Furthermore, while lossy video compression may work well for motion-oriented images (e.g., movies), its implementation typically results in blurred or obliterated text, which limits its use for certain applications, such as cybersecurity monitoring and surveillance. Accordingly, skilled practitioners of the art will recognize that the disadvantages of lossy video compression may outweigh its advantages, especially when higher levels of detail are advantageous when monitoring a remote user interface (UI) displaying multimedia content.

Certain aspects of this disclosure may likewise reflect an appreciation that traditional streaming media approaches require pre-processing to encode multimedia content into a format optimized for streaming. However, such pre-processing may consume significant computing resources. Furthermore, typical streaming media approaches are implemented as either on-demand pulls of pre-processed video files (e.g., YouTube videos) or broadcast streams of the same video content to multiple parties (e.g., live web cam). Moreover, certain aspects of the disclosure reflect an appreciation that such streaming media approaches are cumbersome, as they are inherently designed to serve multiple clients, not an individual user's interaction with a particular device.

Likewise, certain aspects of this disclosure may reflect an appreciation that the combination of implementing specialized software on a target device, the consumption of computing resources for preprocessing, and lossy compression is not conducive for certain remote monitoring purposes. Furthermore, certain aspects of the disclosure reflect an appreciation that a nominal portion (e.g., less than 1%) of information collected during security monitoring operations is typically analyzed. Accordingly, devoting large amounts of computing resources to collecting, processing and storing monitored content may not be justified.

Certain aspects of this disclosure may likewise reflect an appreciation that monitoring operations associated with effective cyber security surveillance often benefit from capturing, and recording, user interaction with content within a UI of an associated endpoint device. Furthermore, certain aspects of the disclosure reflect an appreciation that such capturing and recording should likewise not rely upon the implementation of specialized software on a target device or the consumption of large amounts of network bandwidth to be effective. Moreover, certain aspects of the disclosure reflect an appreciation that the communication of such content be secure.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 illustrates a simplified block diagram of an example information handling system 100 in which the methods and systems disclosed herein may be implemented, in accordance with embodiments of the present disclosure.

Information handling system 100 may include a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 may also include a network port 110 operable to couple to a network 140, which may likewise be accessible by a service provider server 142. Information handling system 100 may likewise include system memory 112, which may be interconnected to the foregoing via one or more buses 114.

System memory 112 may further include operating system (OS) 116 and in various embodiments may also include a real-time video transcoding system 118. In some embodiments, information handling system 100 may be able to download real-time video transcoding system 118 from service provider server 142. In these and other embodiments, real-time video transcoding system 118 may be provided as a service from service provider server 142.

In various embodiments, real-time video transcoding system 118 may perform operations for real-time video transcoding of streaming image data. In some embodiments, one or more such operations may improve processor efficiency, and thus the efficiency of information handling system 100, by enabling real-time playback of non-lossy image data requiring fewer processing resources than previously-known techniques. As will be appreciated, once information handling system 100 is configured to perform such operations relating to real-time video transcoding of streaming image data, information handling system 100 becomes a specialized computing device specifically configured to perform the real-time video transcoding of streaming image data and is not a general purpose computing device. Moreover, the implementation of the real-time video transcoding system 118 on the information handling system 100 may improve the functionality of the information handling system 100 and provides a useful and concrete result of real-time video transcoding of streaming image data when monitoring a target device.

Figure 2:
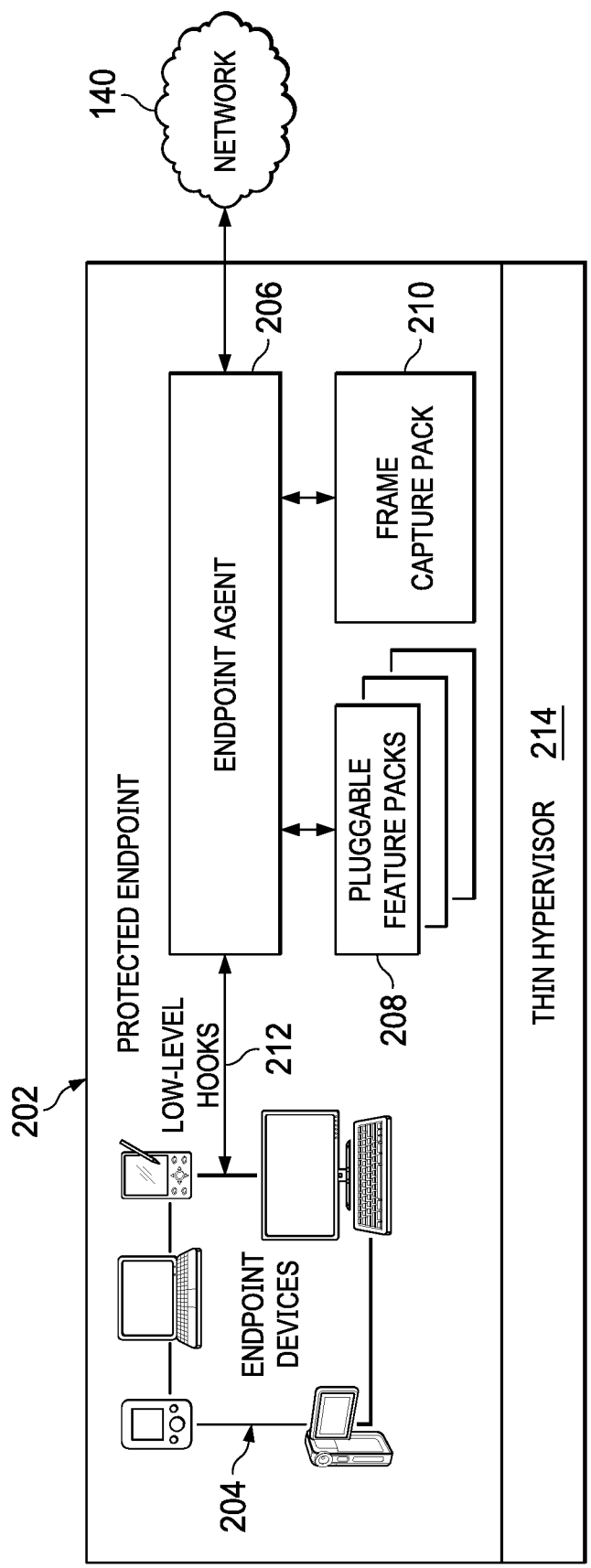
FIG. 2 illustrates a simplified block diagram of an endpoint agent, in accordance with embodiments of the present disclosure.

FIG. 2 illustrates a simplified block diagram of an endpoint agent 206, in accordance with embodiments of the present disclosure. As used herein, an endpoint agent 206 may broadly refer to a software agent used in combination with an endpoint device 204 to establish a protected endpoint 202. Skilled practitioners of the art will be familiar with software agents, which are computer programs that perform actions on behalf of a user or another program. In various approaches, a software agent may be autonomous or work together with another agent or a user. In certain of these approaches, the software agent may be implemented to autonomously decide if a particular action is appropriate for a given event, such as an observed user behavior.

An endpoint device 204, as likewise used herein, may broadly refer to an information handling system such as a personal computer, a laptop computer, a tablet computer, a smart phone, a mobile telephone, a digital camera, a video camera, or other device that is capable of storing, processing and communicating data. In various embodiments, the communication of the data may take place in real-time or near-real-time. As an example, a cellular phone conversation may be used to communicate information in real-time, while an instant message (IM) exchange may be used to communicate information in near-real-time. As used herein, "real-time" may broadly refer to processing and providing information within a time interval brief enough to not be discernable by a user. In some embodiments, the communication of the information may take place asynchronously.

For example, an email message may be stored on an endpoint device 204 when it is offline. In this example, the information may be communicated to its intended recipient once the endpoint device 204 gains access to a network 140.

A protected endpoint 202, as likewise used herein, may broadly refer to a policy-based approach to network security that typically requires endpoint devices 204 to comply with particular criteria before they are granted access to network resources. As an example, a given endpoint device 204 may be required to have a particular operating system (OS), or version thereof, a Virtual Private Network (VPN) client, anti-virus software with current updates, and so forth.

In certain embodiments, endpoint agent 206 may be implemented to universally support a variety of operating systems, such as Apple Macintosh®, Microsoft Windows®, Linux®, and so forth. In certain embodiments, endpoint agent 206 may be implemented to interact with endpoint device 204 through the use of low-level hooks 212 at the OS level. It will be appreciated that the use of low-level hooks 212 may allow endpoint agent 206 to subscribe to multiple events through a single hook. Accordingly, multiple functionalities provided by endpoint agent 206 may share a single data stream, using only those portions of the data stream they may individually need. Accordingly, system efficiency can be improved and operational overhead reduced.

In various embodiments, endpoint agent 206 may be implemented to provide a common infrastructure for pluggable feature packs 208. In certain of these embodiments, pluggable feature packs 208 may provide various security management functionalities. Examples of such functionalities may include various anti-virus and malware detection, data loss protection (DLP), insider threat detection, and so forth.

In certain embodiments, individual features of a particular pluggable feature pack 208 may be invoked as needed. It will be appreciated that the ability to invoke individual features of a pluggable feature pack 208, without necessarily invoking all such features, may likely improve the operational efficiency of the endpoint agent 206 while simultaneously reducing operational overhead. Accordingly, endpoint agent 206 can self-optimize in various embodiments by using the common infrastructure and invoking only those pluggable components that are applicable or needed for a given user behavior.

In certain embodiments, individual features of a pluggable feature pack 208 may be invoked by endpoint agent 206 according to the occurrence of a particular user behavior. In certain embodiments, the user behavior may include interaction with certain content displayed within a user interface (UI) associated with an endpoint device 204. As an example, a user may use an endpoint device 204 to access and browse a particular website on the Internet. In this example, the individual actions performed by the user to access and browse the website constitute a user behavior. As another example, a user may use an endpoint device 204 to download a data file from a particular system. In this example, the individual actions performed by the user to download the data file constitute a user behavior.

In certain embodiments, endpoint agent 206 may be implemented with additional functionalities, such as a frame capture pack 210. In various embodiments, frame capture pack 210 may be implemented to capture certain image frame information, as described in greater detail herein, corresponding to content displayed within a UI associated with a particular endpoint device 204. In certain embodiments, a stream of image frames may be captured on an intermittent basis, such as one to four image frames a second. In these embodiments, the frequency in which the image frames are captured is a matter of design choice.

In various embodiments, a stream of image frames may be captured for a predefined period of time, such as 20 seconds. In certain embodiments, the full-frame contents of the first image frame may be captured in its entirety and only those areas of subsequent image frames that have changed within the predefined time period may be captured. As an example, a graphical user interface (GUI) may contain multiple UI windows, one of which is displaying an instant messaging (IM) session. In this example, the portion(s) of the image frame associated with the UI window displaying the IM session may be changing, while other portions of the image frame are not. Accordingly, only the portion(s) of the subsequent image frames associated with the IM session may be captured during the predefined time period. In certain embodiments, the image frame capture process may be repeated for a certain number of predefined time periods. In these embodiments, the predefined time period, and the number of times the image frame capture process is completed, is a matter of design choice.

In certain embodiments, endpoint agent 206 may be implemented with a thin hypervisor 214, which can be run at Ring-1, thereby providing protection for endpoint agent 206 in the event of a breach. As used herein, a thin hypervisor may broadly refer to a simplified, operating system-dependent hypervisor implemented to increase security. As likewise used herein, Ring-1 may broadly refer to approaches allowing guest operating systems to run Ring-0 (i.e., kernel) operations without affecting other guests or the host operating system. Those of skill in the art will recognize that many such embodiments are possible. Accordingly, the foregoing is not intended to limit the spirit, scope or intent of the disclosure.

Figure 3:
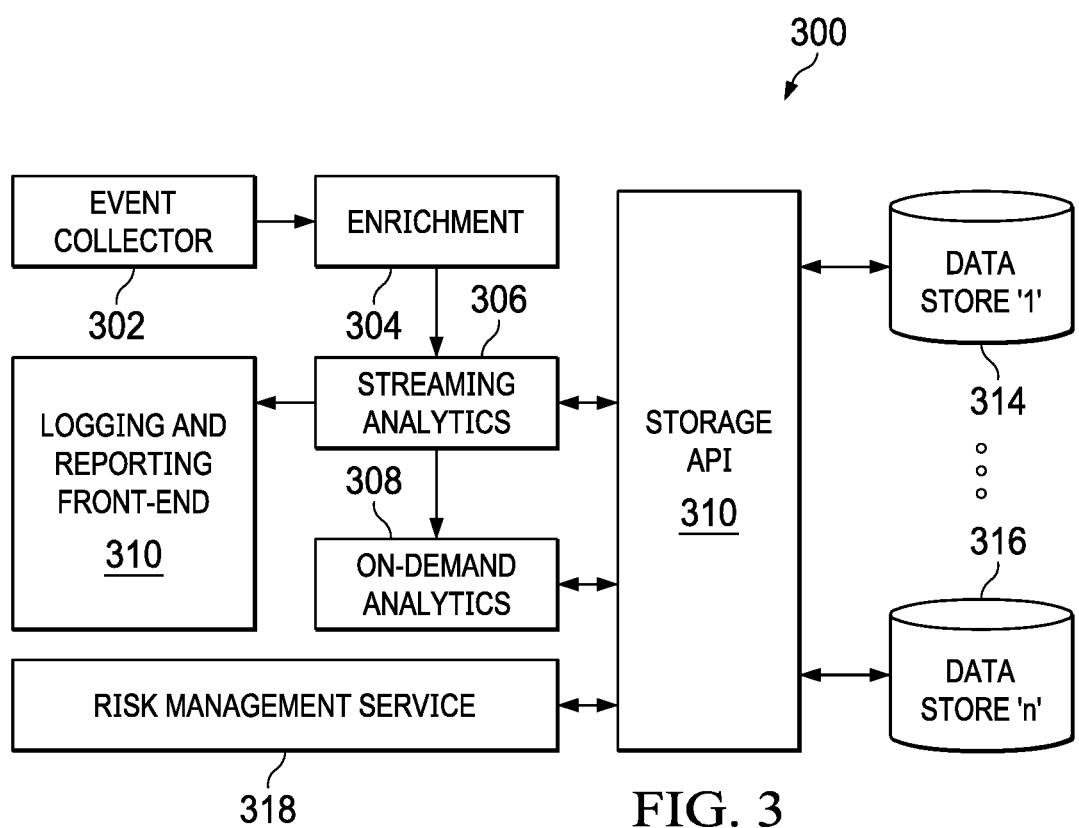
FIG. 3 illustrates a simplified block diagram of a security application implemented on an application server, in accordance with embodiments of the present disclosure.

FIG. 3 illustrates a simplified block diagram of a security application 300 implemented on an application server, in accordance with embodiments of the present disclosure. In certain embodiments, security application 300 shown in FIG. 3 may be implemented to provide various functionalities associated with data loss protection (DLP), insider threat detection, and so forth. In certain embodiments, security application 300 may be implemented to provide log storage, reporting, and analytics capable of performing streaming 306 and on-demand 308 analytics operations. In certain embodiments, security application 300 may be implemented to provide a uniform platform for storing events and contextual information associated with various user behaviors and performing longitudinal analytics. In certain embodiments, the events and contextual information may correspond to certain user interactions with content displayed within the User interface (UI) of an associated endpoint device, as described in greater detail herein.

As used herein, longitudinal analytics may broadly refer to performing analytics of user behaviors occurring over a particular period of time. As an example, a user may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the user behavior enacted by the user is suspicious.

In various embodiments, security application 300 may be implemented to be scalable. In one embodiment, security application 300 may be implemented in a centralized location, such as a corporate data center. In this embodiment, additional resources may be added to security application 300 as needs grow. In another embodiment, security application 300 may be implemented as a distributed system. In this embodiment, security application 300 may span multiple information processing systems. In yet another embodiment, security application 300 may be implemented in a cloud environment. In yet still another embodiment, security application 300 may be implemented in a virtual machine (VM) environment. In such an embodiment, the VM environment may be configured to dynamically and seamlessly scale security application 300 as needed. Skilled practitioners of the art will recognize that many such embodiments are possible. Accordingly, the foregoing is not intended to limit the spirit, scope or intent of the disclosure.

In certain embodiments, an event collector 302 may be implemented to collect event and contextual information, described in greater detail herein, associated with various user behaviors. In these embodiments, the event and contextual information collected by event collector 302 is a matter of design choice. In certain embodiments, the event and contextual information collected by event collector 302 may be processed by an enrichment module 304 to generate enriched user behavior information. In various embodiments, the enrichment may include certain event and contextual information related to a particular user behavior, such as interacting with content displayed within a UI associated with a corresponding endpoint device.

In certain embodiments, enriched user behavior information may be provided to a streaming analytics module 306 by enrichment module 304. In turn, streaming analytics module 306 may provide some or all of the enriched user behavior information to an on-demand analytics module 308. As used herein, streaming analytics may broadly refer to analytics performed in near-real-time on enriched user behavior information as it is received. Likewise, on-demand analytics may broadly refer herein to analytics performed, as it is requested, on enriched user behavior information after it has been received.

In some embodiments, on-demand analytics module 308 may perform on-demand analytics on enriched user behavior associated with a particular interval of time. In these and other embodiments, streaming analytics module 306 or on-demand analytics module 308 may perform analytics on enriched user behavior associated with a particular user, group of users, one or more entities, or a combination thereof. In these and other embodiments, streaming analytics module 306 or on-demand analytics module 308 may perform analytics on enriched user behavior associated with a particular resource, such as a facility, system, data store, or service. In these and other embodiments, streaming analytics module 306 or on-demand analytics module 308 may perform analytics as a result of a user interacting with certain content, or a portion thereof, displayed within a user interface (UI) of a particular endpoint device. Those of skill in the art will recognize that many such embodiments are possible. Accordingly, the foregoing is not intended to limit the spirit, scope or intent of the disclosure.

In some embodiments, the results of various analytics operations performed by streaming analytics module 306 and/or on-demand analytics module 308 may be provided to a storage application program interface (API) 312. In turn, storage API 312 may provide access to various datastores '1' 314 through 'n' 316, which may be used to store the results of the analytics operations. In some embodiments, image frame data collected by an endpoint agent, as described in greater detail herein, may be received and processed by security application 300 and subsequently stored in one or more datastores '1' 314 through 'n' 316. In certain embodiments, security application 300 may be implemented with a logging and reporting front-end 310, which in turn may be used to receive the results of analytics operations performed by the streaming analytics module 306.

In certain embodiments, security application 300 may be implemented to provide a risk management service 318. In certain embodiments, risk management service 318 may be implemented to provide various functionalities for real-time video transcoding of streaming image data as a service. In various embodiments, risk management service 318 may be implemented to provide the results of various analytics operations performed by the streaming analytics module 306 and/or on-demand analytics module 308. In certain embodiments, risk management service 318 may be implemented to use storage API 312 to access various image frame information stored in the datastores '1' 314 through 'n' 316. Skilled practitioners of the art will recognize that many such embodiments are possible. Accordingly, the foregoing is not intended to limit the spirit, scope or intent of the disclosure.

Figure 4:
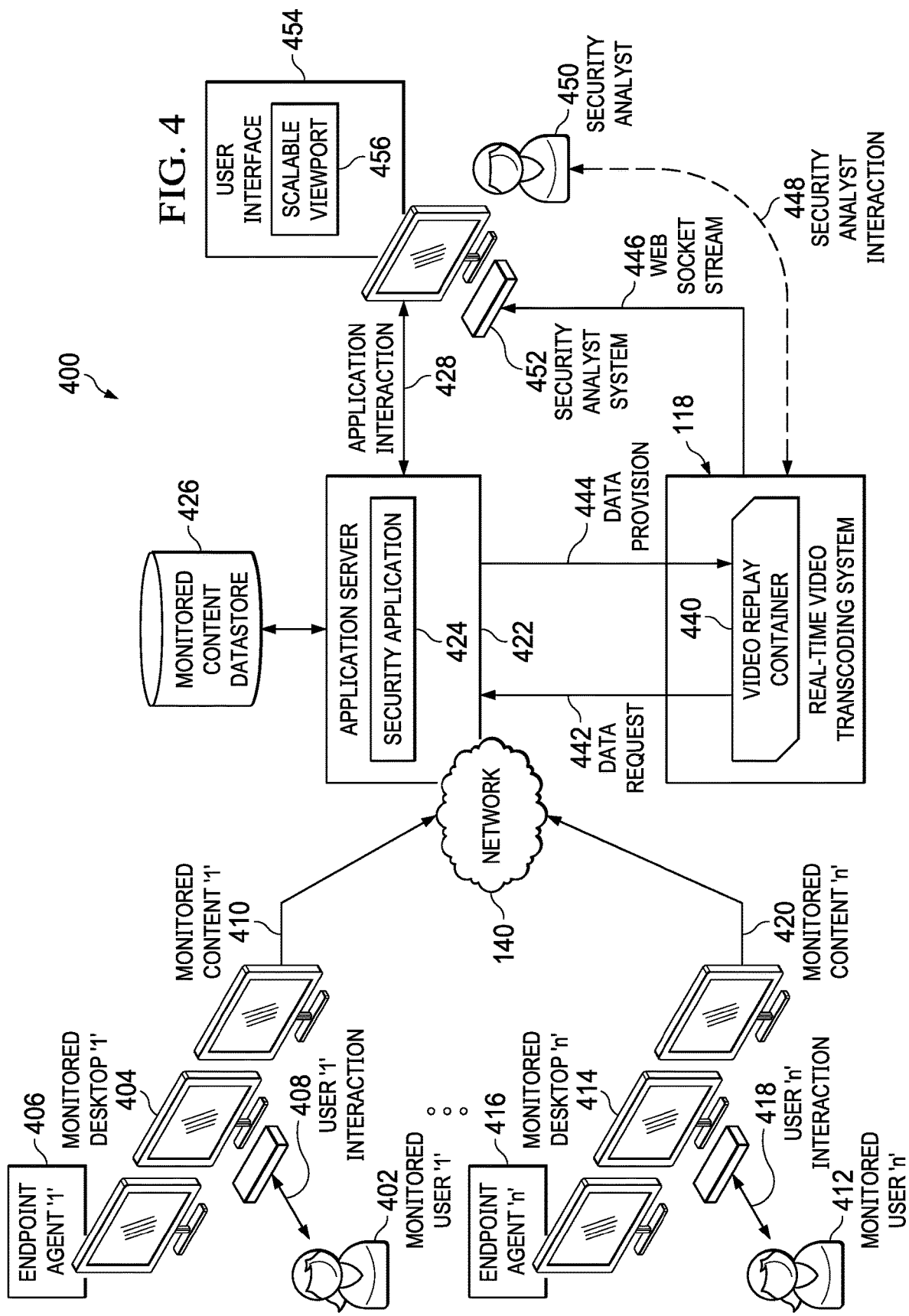
FIG. 4 illustrates a simplified block diagram of a system for real-time video replay of streaming image data, in accordance with embodiments of the present disclosure.

FIG. 4 illustrates a simplified block diagram of a system 400 for real-time video transcoding of streaming image data, in accordance with embodiments of the present disclosure. In some embodiments, real-time video transcoding system 118 may be implemented to facilitate reduction of the consumption of network bandwidth when monitoring a user's interaction with content displayed within a user interface (UI) window. As used herein, content may broadly refer to visual content containing image detail presented on a display. In some embodiments, a UI window may be implemented as an aspect of a desktop environment. As used herein, a desktop environment may broadly refer to an implementation of a desktop metaphor. As likewise used herein, a desktop metaphor may broadly refer to a set of unifying concepts implemented within a GUI that may assist a user to more easily interact with an information handling system. In certain embodiments, the unifying concepts may include various objects, such as documents and folders, which may be displayed within one or more UI windows. Examples of other unifying concepts may include trashcans, recycle bins, menu bars, task bars, pointers, icons, and various desktop widgets familiar to skilled practitioners of the art.

In some embodiments, a security application 424, such as security application 300 described in the descriptive text associated with FIG. 3, may be implemented in combination with an application server 422. In various embodiments, security application 424 may be implemented to monitor a particular user's interaction with certain content displayed within a UI of a corresponding endpoint device. For example, as shown in FIG. 4, security application 424 may be implemented in some embodiments to monitor user interactions '1' 408 through 'n' 418 with monitored user desktops '1' 404 through 'n' 414 respectively associated with users '1' 402 through 'n' 412.

In some embodiments, as described in greater detail herein, endpoint agents '1' 406 through 'n' 416 may be implemented to capture image frame information respectively associated with various user interactions '1' 408 through 'n' 418. In these and other embodiments, such captured image frame information may in turn be respectively conveyed by endpoint agents '1' 406 through 'n' 416 as monitored content '1' 410 through 'n' 420 via network 140 to application server 422. Once received by application server 422, monitored content '1' 410 through 'n' 420 may be provided to security application 424, where it may be processed as described in greater detail herein. In various embodiments, monitored content '1' 410 through 'n' 420, or a portion thereof, may be stored in a repository of monitored content datastore 426.

In some embodiments, security application 424 may be implemented to provide notifications of suspicious user behavior to a security analyst system 452. In certain embodiments, the suspicious user behavior may include a particular user's interaction with certain content. In various embodiments, a security analyst 450 may use the security analyst system 452 to interact 428 with security application 424 to determine whether a particular notification of suspicious user behavior involves investigation.

In some embodiments, security analyst 450 may perform various interactions 448 with real-time video transcoding system 118 to request certain content associated with a particular notification of suspicious user behavior. In these and other embodiments, security analyst 450 may likewise perform various interactions 448 with real-time video transcoding system 118 to provide requested content via a secure web socket stream 446 to security analyst system 452.

In some embodiments, real-time video transcoding system 118 may be implemented to include a video replay container 440. In various embodiments, video replay container 440 may be configured to process a request for certain content associated with a particular notification of suspicious user behavior. In these and other embodiments, video replay container 440 may likewise be configured to provide a request 442 to application server 422 for the requested content. In certain embodiments, application server 422 may in turn be configured to retrieve the requested content from the repository of monitored content 426, which it may then provide 444 to video replay container 440. In these and other embodiments, the real-time video transcoding system 118 may then provide the retrieved content via web socket stream 446 to security analyst system 456.

In some embodiments, the content provided to security analyst system 452 may be displayed within a scalable viewport 456, which in turn may be implemented within an associated UI 454. Skilled practitioners of the art will be familiar with a viewport, which broadly refers to an area, typically rectangular, expressed in rendering device-specific coordinates (e.g., pixels corresponding to certain screen coordinates), within which an object of interest may be rendered. In these and other embodiments, the entirety of scalable viewport 456, or a portion thereof, may be displayed as a monitored UI image within UI 454 of security analyst system 452.

Figure 5:
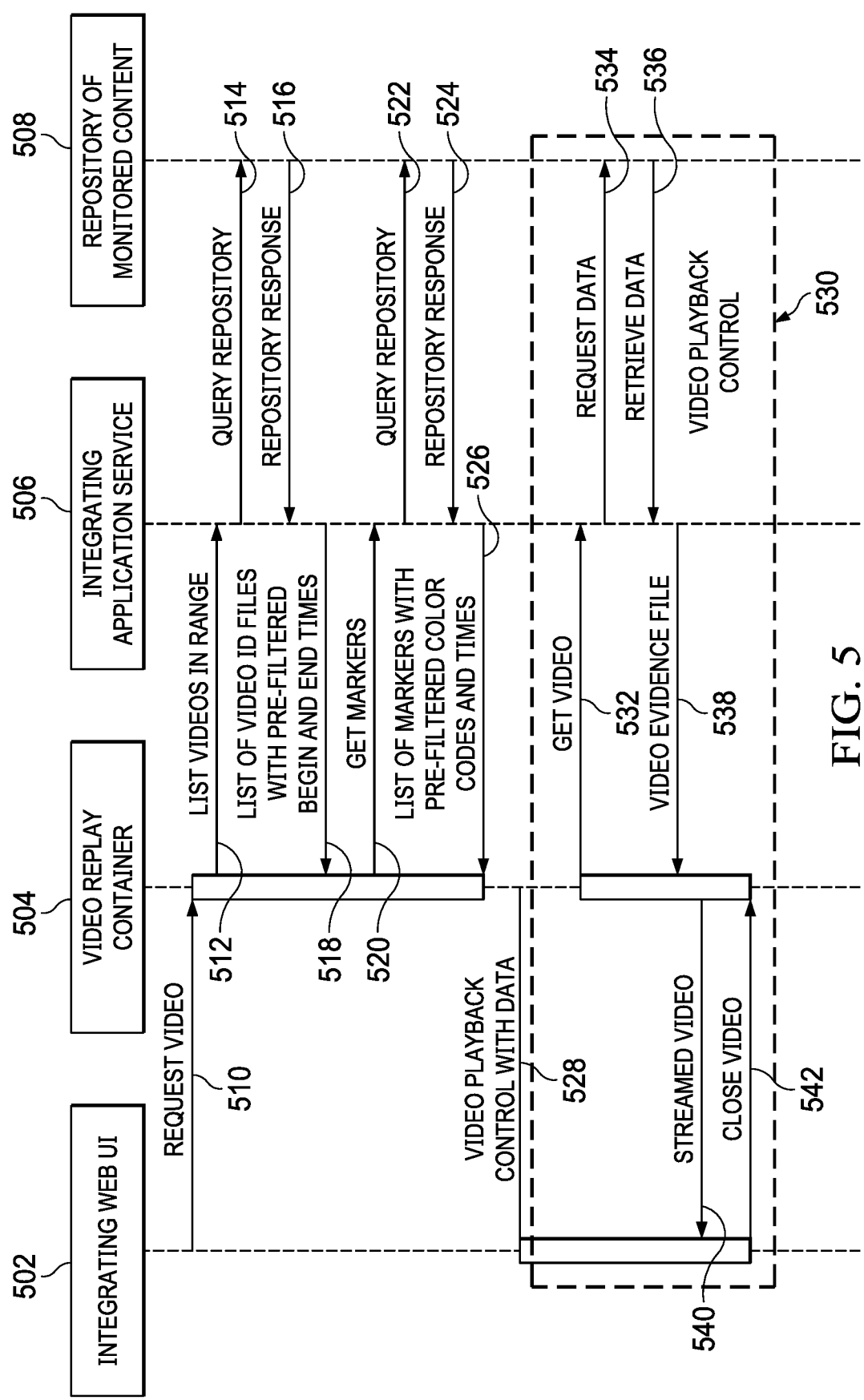
FIG. 5 illustrates a generalized process flow of the operation of a system for real-time video replay of streaming image data, in accordance with embodiments of the present disclosure.

FIG. 5 illustrates a generalized process flow of the operation of a system for real-time video replay of streaming image data, in accordance with embodiments of the present disclosure. As shown in FIG. 5, an integrating web user interface (UI) 502, such as a UI commonly associated with a security analyst system, may request 510 certain image frames from a video replay container 504, described in greater detail herein. In turn, video replay container 504 may provide 512 a list of image frames within the range of requested image frames to an integrating application service 506, such as an application server, likewise described in greater detail herein. In turn, integrating application service 506 may query 514 a repository of monitored content 508 for the requested list of image frames.

In response, the repository of monitored content 508 may respond 516 to integrating application service 506 with the requested list of image frames. In turn, integrating application service 506 may provide 518 the list of image frame identifiers to video replay container 504. In some embodiments, the list of image frame identifiers may be pre-filtered with begin and end times corresponding to a particular stream of image frames. In response, video replay container 504 may submit 520 a "get list of markers" request to integrating application service 506, which in turn, may submit a query 522 for the requested list of markers to repository of monitored content 508.

In response, the repository of monitored content 508 may respond 524 to the integrating application service 506 with the requested list of markers. In turn, integrating application service 506 may provide 526 the list of markers to video replay container 504. In some embodiments, the list of markers may be pre-filtered with color codes, begin and end times corresponding to a particular stream of image frames, or a combination thereof. In turn, video replay container 504 may submit 528 video playback controls, and associated image frame data, to integrating web UI 502 to initiate video playback control operations 530 for the image frame stream.

In some embodiments, video playback control operations 530 include the video replay container 504 submitting 532 a "get video" request to integrating application service 506 in order to request image frames. In turn, integrating application service 506 may submit 534 a list of the requested image frames to repository of monitored content 508. In response, repository of monitored content 508 may provide 536 the requested image frames to integrating application service 506, which in turn may provide 538 a video evidence file to video replay container 504. In turn, video replay container 504 may provide 540 a video stream of image files to integrating web UI 502, where they may be displayed. In some embodiments, the integrating web UI 502 may submit 542 a "close stream" command to video replay container 504, which concludes video playback control operations 530.

Figure 6:
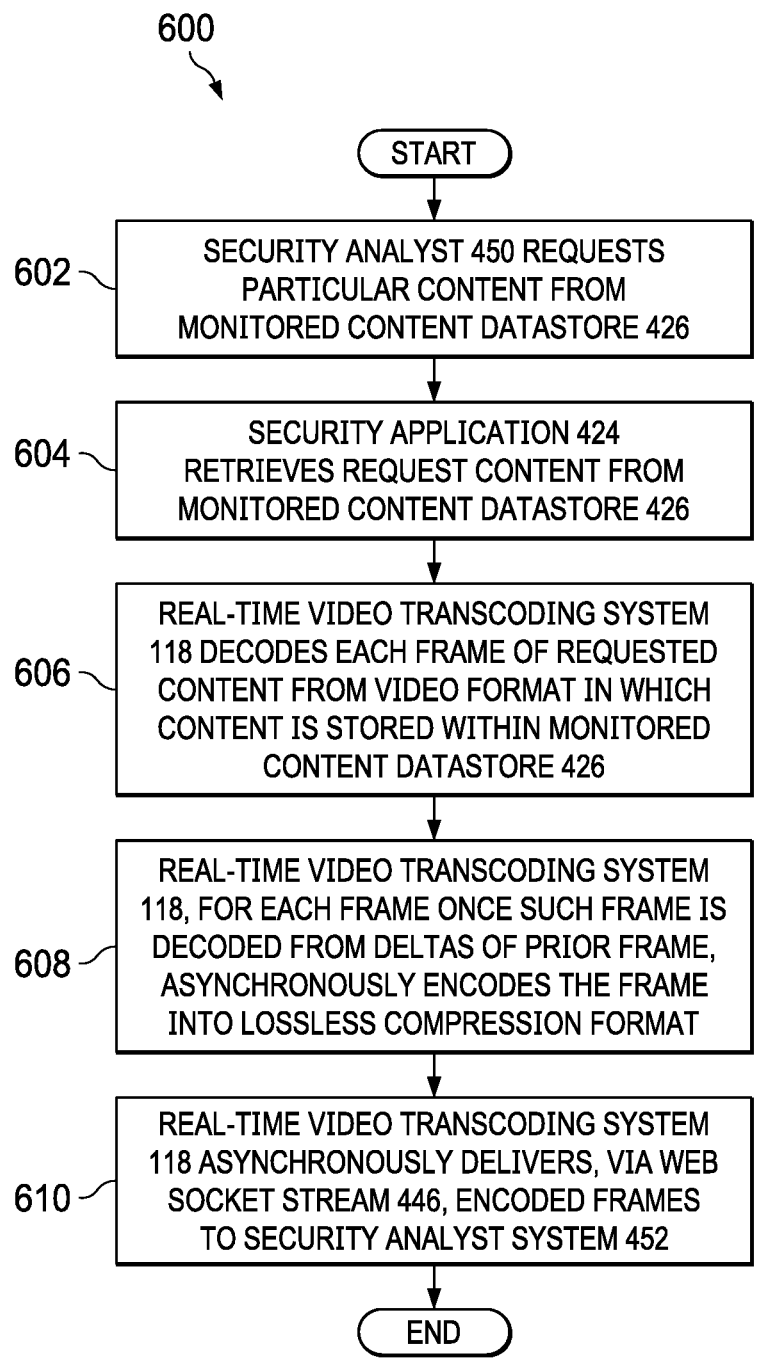
FIG. 6 illustrates a flow chart of an example method for real-time video transcoding of streaming image data, in accordance with embodiments of the present disclosure.

FIG. 6 illustrates a flow chart of an example method 600 for real-time video encoding of streaming image data, in accordance with embodiments of the present disclosure. In some embodiments, real-time video transcoding system 118 may be implemented to monitor a user's interaction with certain content displayed within a user interface (UI) of a target endpoint device. In these and other embodiments, an endpoint agent, likewise described in greater detail herein, may be implemented to capture image frame information corresponding to content displayed within a user interface (UI) of the target endpoint device. In these and other embodiments, the endpoint agent may be implemented to capture a stream of individual image frames. In these and other embodiments, a security analyst system may be implemented to request playback of content from a repository of monitored content. In these and other embodiments, such content may be retrieved from a repository of monitored content and provided to a security analyst system for display, as detailed above with respect to the discussion of FIG. 5. Skilled practitioners of the art will recognize that many such embodiments are possible. Accordingly, the foregoing is not intended to limit the spirit, scope or intent of the disclosure.

Figure 7:
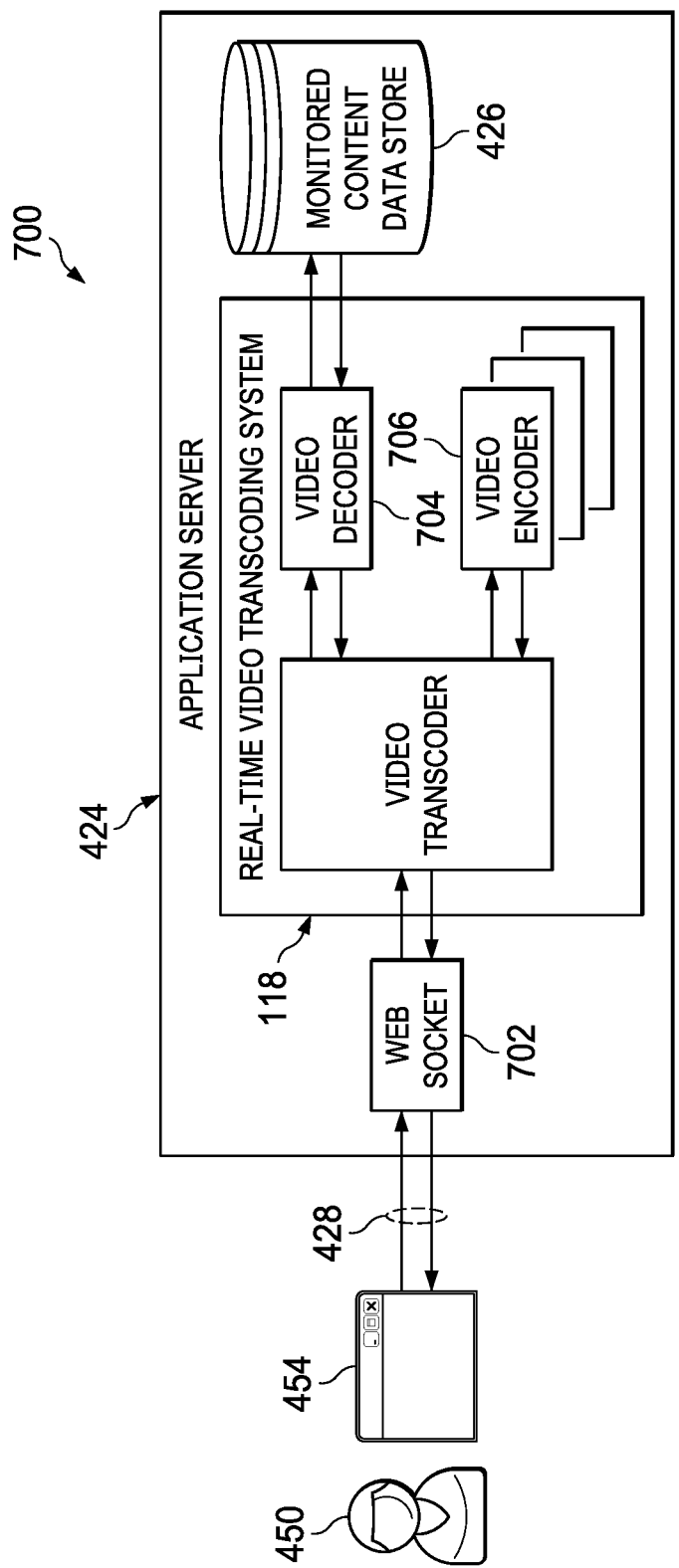
FIG. 7 illustrates a simplified block diagram of a system for real-time video transcoding of streaming image data, in accordance with embodiments of the present disclosure.

According to some embodiments, method 600 may begin at step 602. As noted above, teachings of the present disclosure may be implemented in a variety of configurations of information handling system 100. Description of method 600 herein makes reference to components present in FIG. 4 and FIG. 7. FIG. 7 illustrates a simplified block diagram of a system 700 for real-time video transcoding of streaming image data, in accordance with embodiments of the present disclosure.

At step 602, a security analyst 450 may, via an application interaction 428 to a web socket 702 of application server, request particular content (e.g., a 20-second video) from monitored content datastore 426. In response, at step 604, security application 424 may retrieve the requested content from monitored content datastore 426. At step 606, a video decoder 704 of real-time video transcoding system 118 may decode each frame of the requested content from a video format (e.g., a proprietary data format) in which it is stored within monitored content datastore 426. For example, such video format may be one in which the full-frame contents of a first image frame may be captured in its entirety and only those areas of subsequent image frames that have changed within the predefined time period may be captured.

At step 608, a video encoder 706 of real-time video transcoding system 118 may, for each frame once such frame is decoded from deltas of the prior frame in step 606, asynchronously encode the frame into a lossless compression format (e.g., PNG). Such asynchronous encoding may allow encoding to be performed by all available processing resources of application server 422 and may streamline video processing by leveraging all processing resources available to application server 422, allowing faster encoding as compared to synchronous encoding techniques used in traditional approaches, and thus enabling real-time video streaming.

At step 610, real-time video transcoding system 118 may asynchronously deliver, via web socket 702 and web socket stream 446, the encoded frames to security analyst system 452 for viewing by security analyst 450 on user interface 454. After completion of step 610, method 600 may end.

In the context of processing video and as used herein, "synchronous" means processing video frames one at time. For example, synchronous processes may include processing a first frame of a video completely before moving on the process the second frame, and so on up to the processing of the final frame of a video. On the other hand, in the context of processing video and as used herein, "asynchronous" means that several frames are processed at a time. For example, simultaneous processing of a first, second, and third frame may begin at the same time. The results of such processing are combined and begin to be converted to a non-lossy (e.g., PNG) format, encoded (e.g., Base64 encoded), and sent to user interface. Meanwhile processing may begin for a fourth, fifth, and sixth frame of the video, meaning a number of frames (e.g., six in the present example) may be processed in parallel as 4, 5, and 6 begin processing. Thus, in this example, six frames may be being processed in parallel from the first frame to a final frame of a video.

Although FIG. 6 discloses a particular number of steps to be taken with respect to method 600, method 600 may be executed with greater or lesser steps than those depicted in FIG. 6. In addition, although FIG. 6 discloses a certain order of steps to be taken with respect to method 600, the steps comprising method 600 may be completed in any suitable order.

Method 600 may be implemented using information handling system 100 or any other system operable to implement method 600. In certain embodiments, method 600 may be implemented partially or fully in software and/or firmware embodied in computer-readable media.

The systems and methods described above may have one or more advantages over existing approaches to video replay. First, the methods and systems described herein may enable a fast and lightweight solution for transcoding a low frame-rate video stream because it allows endpoints to capture video at low frame rates which preserves system responsiveness by maximizing the resources available to a user. The systems and methods also enable a high-compression algorithm that requires less space on endpoints and on the server, yet can be uncompressed and decoded using asynchronous methods in real time. The systems and methods described herein may also allow video to be displayed at any point in the stream, reducing lag time, and supports responsive scrubbing, allowing a viewer to move both backwards and forwards in time in the video data stream. The systems and methods described herein may also allow a viewer to quickly pan around its images and zoom in for greater detail because images may be delivered to a browser in a non-lossy (e.g., PNG) format.

As will be appreciated by one skilled in the art, the present embodiments of the present disclosure may be embodied as a method, system, or computer program product. Accordingly, embodiments of the disclosure may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present disclosure may take the form of a computer program product on a computer-usable storage medium having computer-usable program code embodied in the medium.

Any suitable computer usable or computer readable medium may be utilized to implement all or a portion of the embodiments of this disclosure. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages.

The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet service provider).

Embodiments of the disclosure may be described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding this disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method comprising:
receiving a video stream of image frames in a video format, wherein the video stream is received from an endpoint device and comprises keystroke and/or mouse data indicative of user interactions with content displayed on a user interface of the endpoint device;

decoding image frames of the video stream from the video format;

for each respective frame of the image frames, upon completion of decoding of the respective frame, asynchronously encoding the respective frame into a lossless compression format, wherein the asynchronously encoding includes encoding a plurality of the respective frames simultaneously into the lossless compression format; and asynchronously streaming all of the respective frames as encoded into the lossless compression format as a resulting video stream for display to a video display device.

2. The method of claim 1, wherein the video format comprises full-frame contents of a first image frame of the video stream in its entirety, and for all subsequent frames of the video stream, only those areas of the subsequent image frames that have changed from a previous image frame of the video stream.

3. The method of claim 1, wherein the lossless compression format comprises Portable Network Graphics (PNG) format.

4. The method of claim 1, further comprising:

detecting suspicious user behavior in the user interactions; and notifying a security analyst of the suspicious behavior.

5. A system comprising:

a processor; and a non-transitory, computer-readable storage medium comprising instructions executable by the processor for:

receiving a video stream of image frames in a video format, wherein the video stream is received from an endpoint device and comprises keystroke and/or mouse data indicative of user interactions with content displayed on a user interface of the endpoint device;

decoding image frames of the video stream from the video format;

for each respective frame of the image frames, upon completion of decoding of the respective frame, asynchronously encoding the respective frame into a lossless compression format, wherein the asynchronously encoding includes encoding a plurality of the respective frames simultaneously into the lossless compression format; and asynchronously streaming all of the respective frames as encoded into the lossless compression format as a resulting video stream for display to a video display device.

6. The system of claim 5, wherein the video format comprises full-frame contents of a first image frame of the video stream in its entirety, and for all subsequent frames of the video stream, only those areas of the subsequent image frames that have changed from a previous image frame of the video stream.

7. The system of claim 5, wherein the lossless compression format comprises Portable Network Graphics (PNG) format.

8. The system of claim 5, wherein the instructions are further executable for:

detecting suspicious user behavior in the user interactions; and notifying a security analyst of the suspicious behavior.

9. A non-transitory, computer-readable storage medium embodying computer executable instructions configured for:

receiving a video stream of image frames in a video format, wherein the video stream is received from an endpoint device and comprises keystroke and/or mouse data indicative of user interactions with content displayed on a user interface of the endpoint device;

decoding image frames of the video stream from the video format;

for each respective frame of the image frames, upon completion of decoding of the respective frame, asynchronously encoding the respective frame into a lossless compression format, wherein the asynchronously encoding includes encoding a plurality of the respective frames simultaneously into the lossless compression format; and asynchronously streaming all of the respective frames as encoded into the lossless compression format as a resulting video stream for display to a video display device.

10. The storage medium of claim 9, wherein the video format comprises full-frame contents of a first image frame of the video stream in its entirety, and for all subsequent frames of the video stream, only those areas of the subsequent image frames that have changed from a previous image frame of the video stream.

11. The storage medium of claim 9, wherein the lossless compression format comprises Portable Network Graphics (PNG) format.

12. The storage medium of claim 9, wherein the computer-executable instructions are further configured for:

detecting suspicious user behavior in the user interactions; and notifying a security analyst of the suspicious behavior.

* * * * *